June 12, 1951 H. S. AIKMAN 2,556,568
CONTAINER
Filed Nov. 9, 1946 2 Sheets-Sheet 1
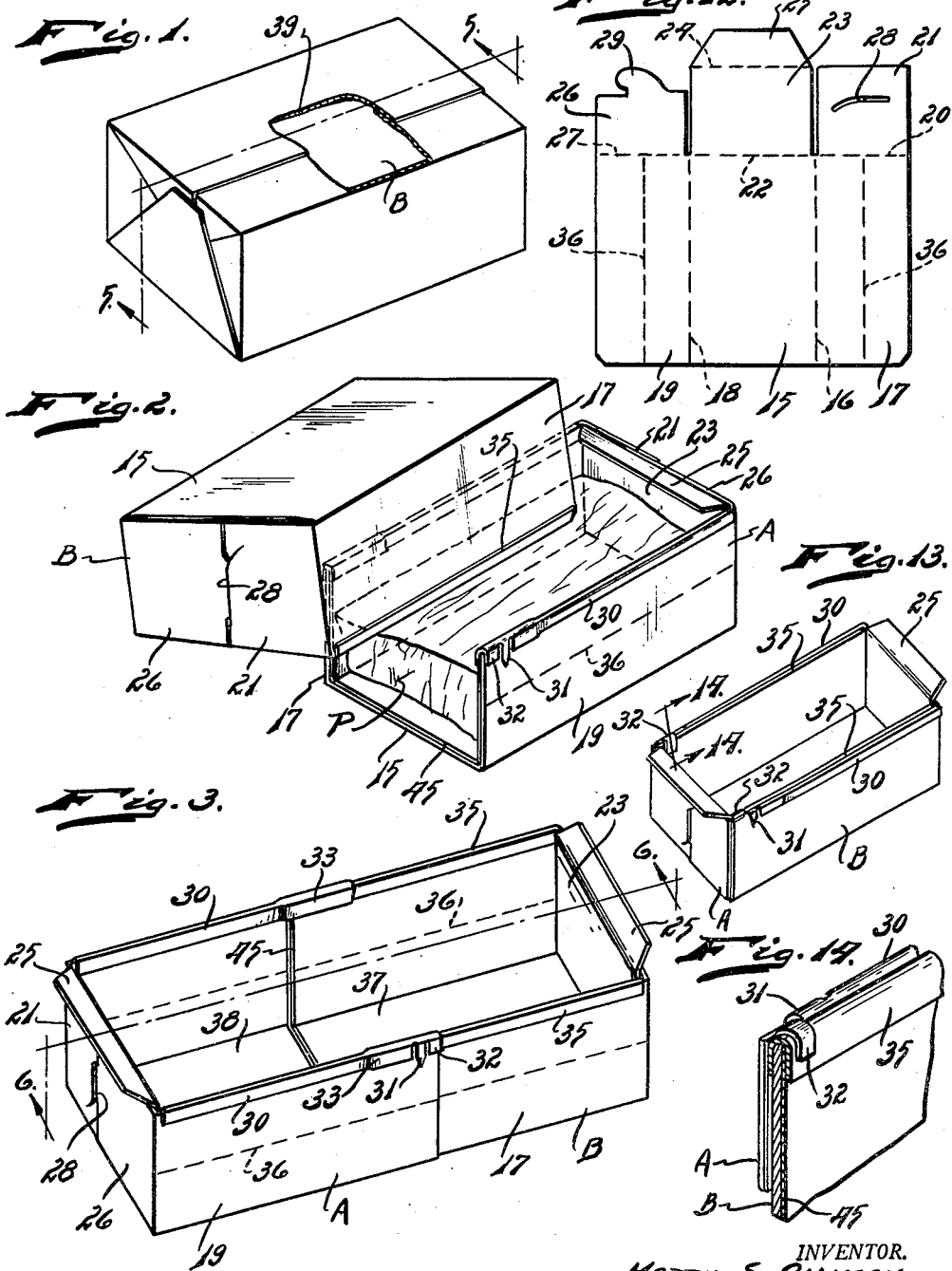
INVENTOR.
HARRY S. AIKMAN
BY Thos. L. Donnelly
ATTORNEY

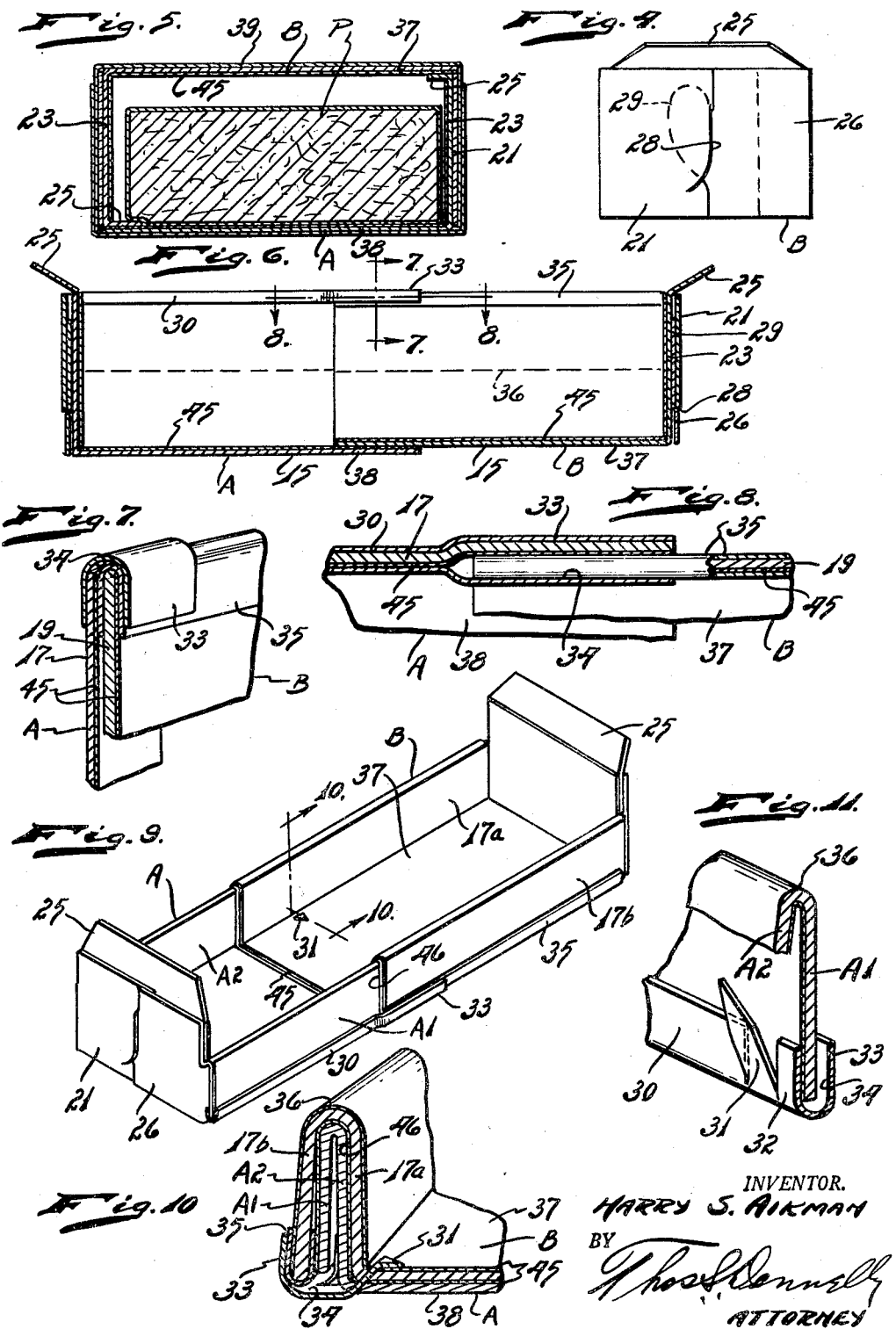

Patented June 12, 1951

2,556,568

UNITED STATES PATENT OFFICE 2,556,568

CONTAINER

Harry S. Aikman, Port Huron, Mich.

Application November 9, 1946, Serial No. 708,961

3 Claims. (Cl. 229—23)

My invention relates to a new and useful improvement in a merchantable package and container for the same. The package enclosed by the container consists of prepared mixtures in dry form containing activated yeast so that the mixtures are adapted for baking yeast raised bread, rolls, buns, coffee cakes, pastry and the like. The invention provides a novel method of preparing and distributing such products as well as a new package readily adaptable to the size, shape and increases in volume of the finished products required in baking operation.

Another object of the invention is to provide a shipping container which can be readily and easily converted into a baking pan of proper size and which is so constructed and arranged that the user may, if desired to use only a portion of the contents of the shipping container at one baking, adjust the pan to its proportion and size.

Another object of the invention is the provision of a shipping container so arranged and constructed that it may be easily and quickly secured together.

Other objects will appear hereinafter.

It is recognized that various modifications and changes may be made in the invention set forth herein without departing from the invention itself and it is intended that such variations and modifications shall be embraced within the scope of the claims which form a part hereof.

Forming a part of this specification and which serve as a means of illustrating the invention set out herein, are drawings in which:

Fig. 1 is a perspective view of the package with a part of the covering broken away;

Fig. 2 is a perspective view of the two sections of the shipping container or carton showing the sections in separated relation;

Fig. 3 is a perspective view of the shipping container or carton with the sections joined together at full size and ready for use as a baking pan, Fig. 4 is an end elevational view of the package, Fig. 5 is a sectional view taken on line 5—5 of Fig. 1, Fig. 6 is a sectional view taken on line 6—6 of Fig. 3, Fig. 7 is an enlarged fragmentary sectional view taken on line 7—7 of Fig. 6, Fig. 8 is a fragmentary enlarged sectional view taken on line 8—8 of Fig. 6, Fig. 9 is a perspective view of the shipping container or carton showing it arranged into a different form for use as a baking pan, Fig. 10 is a sectional view taken on line 10—10 of Fig. 9, Fig. 11 is a fragmentary sectional view with parts broken away illustrating the binding tongues used in the invention, Fig. 12 is a plan view of the blank used in forming the container sections, Fig. 13 is a perspective view of the sections in their assembled relation for forming a baking pan of less dimensions, Fig. 14 is a fragmentary sectional view taken on line 14—14 of Fig. 13.

The carton or shipping container comprises two sections A and B. These sections are constructed similarly excepting section B is slightly narrower than the section A so that the section B may slide into the end of the section A, as shown in Fig. 3. Each section is made from a blank which is illustrated in Fig. 12 and which comprises a body 15 formed from suitable materials such as heavy cardboard or the like. The body 15 is scored along the dotted line 16 so that a portion 17 may be folded upwardly to provide a side wall. The body 15 is also scored along the line 18 so that the portion 19 may be folded upwardly to provide a side wall. An end flap 21 is formed on the body 17 and folded inwardly toward the body along the scored line 20. An end flap 23 is formed on the body 15 and may be folded inwardly thereon on the scored line 22. A lifting tab 25 projects outwardly from the portion 23 and may be folded thereon on the scored line 24. A side wall 19 is provided with the end flap or tab 26 which may be folded on the scored line 27 to provide an end flap. An end flap 26 has a tongue 29 projecting outwardly therefrom which is adapted to insert through the slit 28 formed in the flap 21 to secure the parts together. In arranging the sections, the member 23 is folded upwardly to extend at right angles to the portion 15 and the lifting tab 25 is folded inwardly on the scored line 24 as clearly seen in Fig. 2. The members 17 and 19 are then folded to extend at right angles, as shown in Fig. 2, and the flaps 21 and 26 are joined together by the tongue and slot arrangement so that there is thus provided a box-like container which is open at its top and open at one of its ends. A rigid U-shaped re-inforcing strip 30 is extended along the edges of the side walls 17 and 19 on the section A. This strip 30 may be made from metal, plastic, or any other suitable rigid material. Struck from the strip 30 is a pointed tongue 31 spaced apart from another tongue 32. The channel re-inforcing strip 30 is widened at one end as at 33 to provide the space 34. Positioned over the longitudinal edges of each of the side walls of the section B is a rigid re-inforcing strip 35 U-shaped in cross sections.

In use, the package P of material, which is contained in a paper bag or other suitable covering, is placed in the section A, as shown in Fig. 2. The section B is then placed in inverted relation to the section A and the side walls thereof placed within the side walls of the section A so that the end wall of the section A will abut against the end edges of the side wall of the section B, thus, forming a stiff carton or container for the package P. The package thus provided is then wrapped in a suitable wrapping 39 which is secured in position thereon and in this condition, the package is displayed on the shelves of the store and sold to the customer. When the customer desires to use the contents of the package, the covering 39 is torn away and the section B lifted from the section A, thus, surrendering access to the package P. To arrange the shipping container or carton for use as a baking pan, the sections A and B are assembled as shown in Fig. 3, the bottom 37 of the section B being positioned above the bottom 38 of the section A and the side walls of the section B lying within the side walls of the section A and engaging in the enlarged channel or space 34. The sections are then moved inwardly of each other until the end of the enlarged channel or space 34 serves in abutment for preventing further inward movement. The tabs 25 may then be folded outwardly to form lifting lugs. If desired, these sections A and B may be lined with a suitable liner 45 which may be a vegetable oil impregnated or paraffin impregnated paper or cardboard. When the user has removed the package, it is but necessary to empty the dry mixture into a mixing bowl and add to the dry mixture the specified amount of water and then mix the mass into a smooth, tough, elastic dough, requiring about two minutes. The dough is then placed into the shipping container which has been converted into the backing utensil of proper size to insure the correct fermentation by allowing the dough to raise to the top of the baking utensil. When the mixed dough has raised to the top of the baking pan, the loaf will then be ready to be placed in the oven for baking. Consequently, when the user, after mixing the dry ingredients with water into a dough-like mass, has placed it in the baking container, the proper fermentation will be indicated when the dough has risen to the top of the pan or container. In this way, there is a control for the fermentation as it is desirable that the loaf be placed in the oven for baking at the proper period of fermentation. Experience has shown that the baking pan should be of the proper size and shape as to insure a uniform baked loaf of bread of proper quality approximately three times the volume of the dry ingredients contained in the shipping container before the same is converted into a baking utensil or pan. In order that this may be accomplished, it is desirable that the cubic content of the baking pan should be approximately or slightly more than twice the cubic contents of the package of dry ingredients. When the dough is placed in the oven it has risen to the upper edges of the pan but during the baking process the loaf of bread will, of course, rise above the pan and thus the additional cubic contents appear.

In using the container to make a smaller loaf of yeast raised bread for smaller families, the container may be adjusted to the position shown in Fig. 13 in which the side walls of the section B are not engaged in the channel or space 34 but merely slid inwardly their full length until the end edges abut the end wall of the section A and the end edges of the side walls of the section A abut the end wall of the section B. These sections may then be secured in place by bending the tongue 32 inwardly so that it clamps the side walls of the section A in fixed relation to the side walls of the section B. The user by then using half of the contents of the package and mixing it with the specified amount of water would place the dough in the container of reduced size and when the dough had fermented and risen to the top of the side walls of the container, a period of fermentation would have passed and the loaf would then be ready for placing in the oven for baking.

When it is desired to make rolls, coffee cakes or the like, the container may be reduced to the shape and form shown in Fig. 9. This is effected by bending the side walls at their upper edges outwardly to overlie each other, this bending being effected on the scoring line 36. The wall section A1 and A2 of the section A are folded upon themselves and slid into the space 46 between the wall sections 17a and 17b of the section B, the wall section 17b sliding in the channel 34. The tongue 31 is then passed through the bottoms 37 and 38 of the sections to hold the sections securely in fixed relation to each other. The container is thus reduced to a form having sides of the correct height to hold rolls, buns, coffee cakes or other yeast raising doughs. The correct height of the sides of the pan or baking utensil insures the uniform distribution of heat while baking so that the rolls, buns, coffee cakes and the like, which are being baked in the container, will acquire the correct browning or coloring so as to appear appetizing and also have a delightful flavor. These side walls will again indicate the proper stage of fermentation so that the user will know when the dough is ready to be placed in the oven. This period of time will, of course, vary, depending upon the climatic conditions and temperature.

It is believed obvious that any desired flour may be used, whether rye, whole wheat, cracked wheat, potato flour, or wheat flour.

What I claim is:

1. A shipping container of the class described, comprising: a closed box-like structure embodying a pair of sections, each of said sections comprising a pair of oppositely disposed side walls, an end wall and a bottom, said side walls being arranged in telescopic relation to provide a closed box-like structure, and said side walls being adapted for telescopic arrangement in longitudinal relation to each other to provide a box-like structure open at one side; and channel bearing members mounted on and embracing the upper edges of the side walls of one of said sections, the edges of the side walls of the other section being adapted for engaging in said channels upon longitudinal telescopic arrangement of said side walls.

2. A shipping container of the class described, comprising: a closed box-like structure embodying a pair of sections, each of said sections comprising a pair of oppositely disposed side walls, an end wall and a bottom, said side walls being arranged in telescopic relation to provide a closed box-like structure, and said side walls being adapted for telescopic arrangement in longitudinal relation to each other to provide a box-like structure open at one side; and channel bearing members mounted on and embracing the upper edges of the side walls of one of said sections, the edges of the side walls of the other section being adapted for engaging in said channels upon longitudinal telescopic arrangement of said side walls; and means on said channels for limiting the telescopic relative movement of said sections in one direction.

3. A shipping container of the class described, comprising: a closed box-like structure embodying a pair of sections, each of said sections comprising a pair of oppositely disposed side walls, an end wall and a bottom, said side walls being arranged in telescopic relation to provide a closed box-like structure, and said side walls being adapted for telescopic arrangement in longitudinal relation to each other to provide a box-like structure open at one side; and channel bearing members mounted on and embracing the upper edges of the side walls of one of said sections, the edges of the side walls of the other section being adapted for engaging in said channels upon longitudinal telescopic arrangement of said side walls; and means on said channels for limiting the telescopic relative movement of said sections in one direction; and means carried by said channel members for securing said sections in fixed relation to each other.

HARRY S. AIKMAN.

REFERENCES CITED

The following references are of record in the file of this patent:

UNITED STATES PATENTS

| Number | Name | Date |
|---|---|---|
| 655,939 | Overton | Aug. 14, 1900 |
| 876,235 | Quackenboss | Jan. 7, 1908 |
| 1,411,223 | Retzbach | Mar. 28, 1922 |
| 1,554,077 | Fay | Sept. 15, 1925 |
| 1,861,124 | Lorber | May 31, 1932 |
| 1,942,212 | Heseltine | Jan. 2, 1934 |
| 1,988,091 | Schumacker | Jan. 15, 1935 |
| 2,039,374 | Young | May 5, 1936 |
| 2,060,030 | Carmichael et al. | Nov. 10, 1936 |
| 2,193,632 | Jonas | Mar. 12, 1940 |
| 2,316,457 | Royce | Apr. 13, 1943 |